United States Patent [19]
Kitchin

[11] 3,918,777
[45] Nov. 11, 1975

[54] SHEET METAL BALL BEARING RETAINER AND METHOD OF MAKING SAME

[75] Inventor: Oscar G. Kitchin, Port Clinton, Ohio

[73] Assignee: General Motors Corporation, Detroit, Mich.

[22] Filed: Nov. 29, 1973

[21] Appl. No.: 420,072

[52] U.S. Cl. .......................... 308/201; 29/148.4 C
[51] Int. Cl.² .......................................... F16C 33/38
[58] Field of Search .................. 308/201, 217, 235; 29/148.4 C

[56] References Cited
UNITED STATES PATENTS

| | | | |
|---|---|---|---|
| 637,984 | 11/1899 | Wright | 308/201 |
| 2,407,388 | 9/1946 | Smith et al. | 308/201 |
| 3,399,937 | 9/1968 | Vannest | 308/201 |
| 3,450,449 | 6/1969 | Sibley et al. | 308/201 |
| 3,539,231 | 11/1970 | Langstrom | 308/201 |
| 3,647,269 | 3/1972 | McKee | 308/201 |

*Primary Examiner*—M. Henson Wood, Jr.
*Assistant Examiner*—Richard A. Bertsch
*Attorney, Agent, or Firm*—F. J. Fodale

[57] ABSTRACT

A ball bearing comprises an inner split ring and a unit-handled subassembly comprising an outer race having a full ball groove, a plurality of balls and a unitary sheet metal retainer. The unitary sheet metal retainer is guided by axially spaced lands of the outer race and retains the balls in assembly with the outer race by pairs of resilient tongues depending from ball spacing sleeves of the retainer. A method of making the unitary sheet metal retainer is also disclosed.

9 Claims, 7 Drawing Figures

SHEET METAL BALL BEARING RETAINER AND METHOD OF MAKING SAME

My invention relates generally to ball bearings and more specifically to unitary sheet metal retainers for ball bearings and methods of making the same.

It is already known to provide a unitary sheet metal device comprising a flat ring having a plurality of circumferentially spaced holes and a plurality of circumferentially spaced cylindrical sleeves depending from the portions of the ring adjacent the holes to space the balls in a ball bearing. Such devices have been used in combination with an outer race having a full ball groove and have been constructed so that the flat ring is spaced closely adjacent the axially spaced shoulders of the outer race and engage these shoulders for guidance during operation. These devices are known as separators since they merely circumferentially space the ball and do not retain the balls in a unit-handled subassembly with the full ball groove outer race.

The prior art separators described above are generally made by cutting a plurality of circumferentially spaced undersized circular holes in a strip or tube blank and drawing cylindrical sleeves from the portion of the blank adjacent the undersized circular holes which are enlarged in the drawing operation. As far as I am aware, no one in the past has successfully provided a race guided unitary sheet metal device which also retains the balls in a unit-handled subassembly with the race or devised a method for making such a device. This absence in the prior art I believe is due to problems encountered in forming the cylindrical sleeves with auxiliary structure at a sufficient depth from the ring to retain the balls without tearing the metal being formed.

It is also already known to provide "retainers" machined from thick stock which retainers are both guided from axially spaced lands on a full groove ball race and which also retain the balls in a unit-handled subassembly with the full groove ball race as exemplified by the U.S. Pat. No. to Bott 1,915,287. Such retainers, however, are heavy and inherently expensive to manufacture. Moreover, the machined type retainers generally depend upon the permanent deformation of portions of the retainer to retain the balls after the balls have been placed in "ball pockets".

It is further known in the art to provide unitary sheet metal "two-way retainers" which retain the ball in either direction without the assistance of either an inner race or an outer race. See for instance the U.S. Pat. to Wright No. 637,984 and the U.S. Patent to Creager No. 645,713. Since these "two-way retainers" are guided by the balls themselves, the ring portions are not and ordinarily cannot be spaced closely adjacent one of the races, this is particularly noticeable in the Wright device where the ring portion is necessarily located approximately in alignment with the centers of the balls.

Also, the sheet metal retainers shown in these two patents are not made like the prior art sheet metal retainer referred to above. The original cuts through the retainer blanks are not undersized holes as the formation of wings or tabs rather than the drawing of significant cylindrical sleeves is contemplated. Due to the necessary significant differences in the location of the rings, these two-way retainers and methods of manufacture are unsuitable for providing or making a retainer wherein the ring must lie closely adjacent axially spaced lands on a full groove ball race for guiding engagement therewith.

Furthermore, the two-way retainer shown in the Wright patent like the machined retainer exemplified by the Bott patent relies on permanent deformation of portions of the retainer to entrap the balls after the balls are placed in "ball pockets". The Creager patent does not clearly indicate whether or not portions of the retainer are permanently deformed after the balls are placed in the ball pockets. However, from a practical standpoint it appears as though they are. But in any event, it is acknowledged that sheet metal retainers in which the balls are snapped past resiliently deformable portions for retention in ball pockets is old.

The object of my invention is to provide a unitary sheet metal retainer capable of being guided from axially spaced lands of a full groove ball bearing race having resilient portions past which the balls may be forced without permanent deformation thereto into ball pockets which circumferentially space the balls and cooperatively with the resilient portions retain the balls in a unit-handled subassembly with the full groove ball bearing race. In this regard, the prior art separator first described above may be considered as a starting point and the above object expressed as the incorporation of a retention feature of the resiliently deformable type in the separator which object also necessitates the concurrent object of discovering a suitable method for making the same.

Yet another object of my invention is to provide a unitary sheet metal retainer having the characteristics outlined above and further having particircular retaining edges associated with sleeves depending from a flat ring which edges facilitate the assembly of the balls into the sleeves which serve as "ball pockets" and a method for making such a retainer.

Still another object of my invention is to provide a sheet metal retainer capable of being guided from the axially spaced lands of a full groove ball bearing race and retaining a plurality of balls circumferentially spaced by the retainer in a unit-handled assembly with the race by elastically deformable portions of the retainer.

Still yet another object of my invention is to provide a method for making a unitary sheet metal retainer having the features immediately outlined above which method avoids the problems of tearing metal during the formation of various portions of the retainer.

Other objects and features of the invention will become apparent to those skilled in the art as the disclosure is made in the following detailed description of a preferred embodiment of the invention as illustrated in the accompanying sheet of drawings in which.

Figure 1:
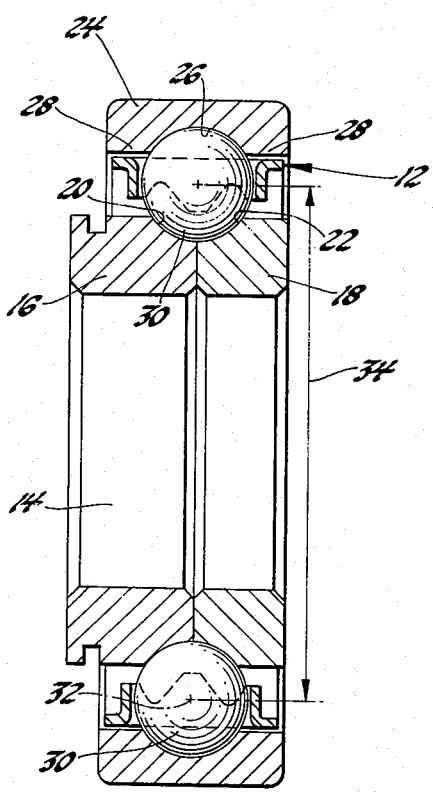
FIG. 1 is an axial section of a ball bearing having a split inner race in a unit-handled subassembly consisting of a plurality of balls, a full groove ball race, and a unitary sheet metal retainer in accordance with my invention.
Figure 2:
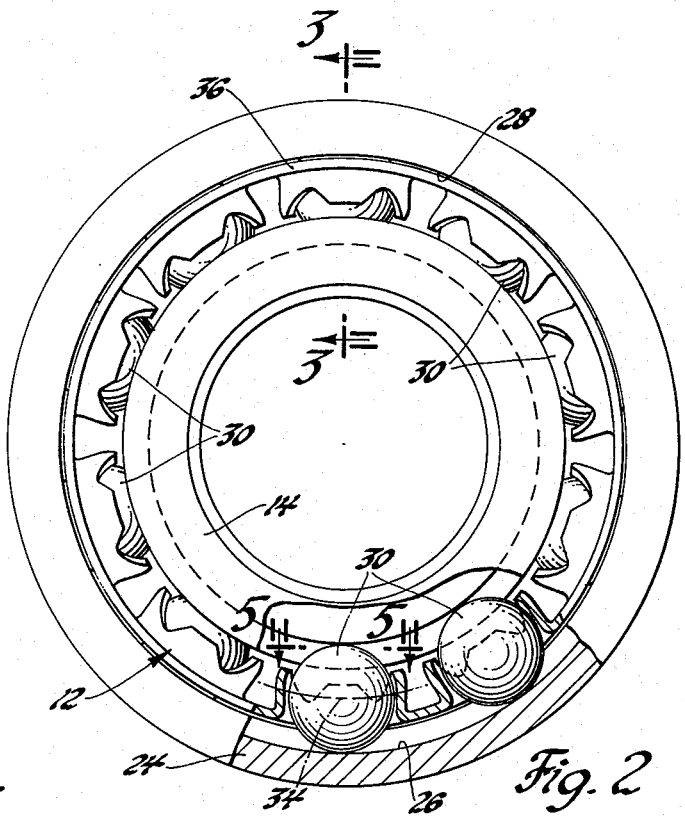
FIG. 2 is a front view of the ball bearing shown in FIG. 1 partially broken away to show the interior parts of the bearing.

Referring now to the drawings and more particularly to FIGS. 1 and 2, a sheet metal retainer 12 in accordance with my invention is illustrated in conjunction with a ball bearing having a split inner race 14 comprised of two abutting rings 16 and 18 having half ball grooves 20 and 22, respectively. The outer race 24 is a conventional outer race having a full ball groove 26 between a pair of axially spaced lands 28. In assembly the balls 30 are circumferentially spaced by the retainer 12 and have their centers 32 located in an imaginary pitch circle 34 determined by the dimensions of the grooves in the inner race 14 and the outer race 24. As is well known in the art, retainers are configured with reference to the pitch circle. With this in mind, the sheet metal retainer 12 is described in reference to the pitch circle 34.

The sheet metal retainer 12 comprises a flat ring 36 which is spaced outwardly of the pitch circle 34 an appreciable distance so that during operation of the bearing the outer surface of the flat ring 36 engages the lands 28 to guide or center the retainer. In actual practice, the outer surface of the flat ring 36 is spaced about a fourth of the diameter of the balls 30 away from the pitch circle 34 and has a diameter which is a few thousandths less than the diameter of the lands 28 permitting some radial float.

The retainer 12 further comprises a plurality of cylindrical sleeves 40 which are aligned with a plurality of circumferentially spaced holes 38 in the flat ring 36 and depend from the portions of the flat ring 36 adjacent the holes 38. The cylindrical sleeves 40 extend radially inwardly from the flat ring 36 and cross the pitch circle 34. Each of the sleeves 40 have four mutually perpendicular arch-shaped scallops 39 which form a pair of depending diametrically opposed tongues 42 interposed between the remaining contiguous particylindrical portions 50 of each sleeve. The terminal edges 44 of the tongues 42 on each sleve 40 are spaced apart a distance less than the diameter of the balls 30 so as to retain the balls 30 in assembly with the outer race 24 in the absence of the inner race 14.

The unit-handled subassembly of retainer, balls and outer race is accomplished by nesting the retainer 12 within the outer race 24 with the sleeves 40 in alignment with the ball groove 26. The balls 30 are then forced past the retaining edges 44 into the sleeves 40 from the inside of the retainer 12. In the operation of the bearing, the balls have a running fit in the sleeves 40 and neither the sleeves 40 nor the tongues 42 interfere with the guidance of the retainer by the lands 28 even though some radial float is possible.

Figure 3:
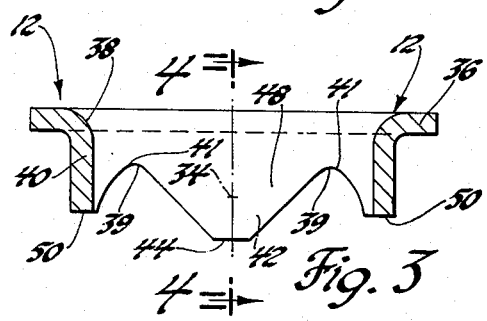
FIG. 3 is a section taken along the line 3—3 of FIG. 2.

I have found that in order to form the unitary sheet metal retainer 12 with tongues of sufficient length to retain the balls and yet avoid interference with the guidance of the retainer by the lands 28, it is necessary that the tongues 42 commence on the same side of the pitch circle 34 as the flat ring 36. One configuration which I have found suitable is that particularly illustrated in FIGS. 3 and 4 in which the apexes 41 of the scallops 39 and consequently the roots of the tongues 42 between them are located approximately midway between the pitch circle 34 and the ends of the sleeves 40 connected to the flat ring 36. Normally a continuous annular surface encircles the balls for about the mid 20% of their diameter to separate them. Because the comparable internal surface around the balls 30 in the retainer 12 is interrupted by the scallops 39, it is preferable to leave uninterrupted the particylindrical portions 50 which in a conventional manner extend across the pitch circle 34 about 10% of the diameter of the balls 30. For this same reason, the root portions 48 of the tongues 42 extending from the roots between the apexes 41 to a location spaced approximately 10% of the ball diameter from the opposite side of the pitch circle are particylindrical continuations of the cylindrical sleeves 40. This configuration provides more than adequate ball location by the retainer during bearing operation and lateral retainment of the ball in the unit-handled subassembly in the absence of the inner race.

Figure 4:
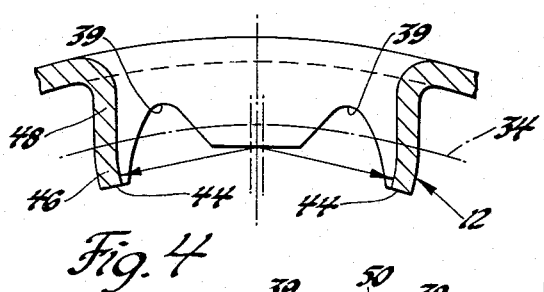
FIG. 4 is a section taken along the line 4—4 of FIG. 3.
Figure 5:
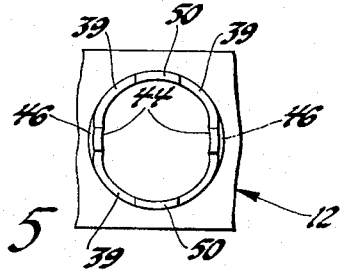
FIG. 5 is a section taken along the line 5—5 of FIG. 2.

I also find it preferable to provide the requisite spacing of the terminal edges 44 by constructing the terminal portions 46 of the tongues partispherical and slightly eccentric to the axis of the sleeves 40 as shown in FIG. 4. This particular form has the advantage that each of the retaining edges 44 are particircular and nearly engage the balls in a line contact without the danger of pointed ends scratching the balls when they are forced into the sleeves 40. Due to the manner in which the retainer is made from sheet metal which is described in detail below, there are practical limits on the width and shape of the tongues 42 and the particylindrical portions 50. However, it is preferable from a strength standpoint to make the the tongues 42 and particylindrical portions 50 of a maximized equal strength for 10% on either side of the projection of the pitch circle 34 which produces the tapered shape of the tongues 42 and particylindrical portions 50 shown in the drawing.

Figure 6:
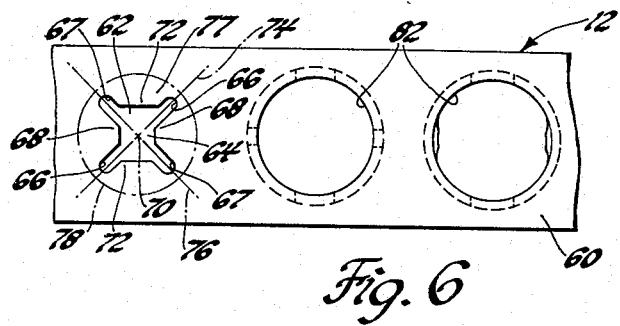
FIG. 6 is a plan view of a part of the retainer shown in FIGS. 1–5 showing portions thereof in various stages of manufacture.
Figure 7:
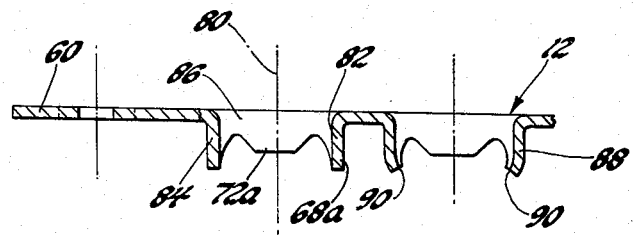
FIG. 7 is a side sectional view corresponding to the part of the retainer shown in FIG. 6.

Referring now to FIGS. 6 and 7, the method of making the sheet metal retainer 12 will now be explained in detail in conjunction with part of the retainer 12 having portions in various stages of formation. The initial blank 60 is preferably a cylinder of uniform thickness although the method in accordance with my invention is also applicable to an initial blank consisting of a flat strip of sheet metal which at some stage is wound into an annulus which may or may not have the butting ends secured to each other in some fashion. In FIGS. 6 and 7, the various stages of formation appear to be in conjunction with a flat strip, however, they are equally understandable in conjunction with an initial cylinder blank if the views are considered as a developed view of a portion of a cylinder.

My method more specifically concerns the manner of forming the portion of the retainers 12 which space and retain the balls 30 in conjunction with the outer race 24 and are classically referred to as ball pockets. The first step in forming a ball pocket for my retainer comprises cutting a cruciform hole through the blank 60. More particularly, the cruciform hole 62 has a generally rectangular central portion 64 and four slot portions 66 and 67 arranged in diametrically opposed pairs 66—66 and 67—67 which form a first set of tangs 68 and a second pair of tangs 72 lying in the plane of the blank 60 and projecting axially toward the center 70 of the hole 62. The axes 74 and 76 of the slotted portions 66 and 67, respectively, are preferably perpendicular and intersect the center 70 of the hole so that roots of all four tangs are equal.

In the next forming operation which may be done in one or more stages, the annular area 77 surrounding the hole 62 outlined by the dashed concentric boundary line 78 uniformly spaced from the ends of the slotted portions 66 and 67 is drawn into an upstanding tube 82 having an axis 80 perpendicular to the actual or developed plane of the blank 60. The tube 82 thus formed has a sleeve portion 84 depending directly from the portion of the blank adjacent a circular hole 86 (larger than the cruciform hole 62) and two pairs of diametrically opposed particylindrical tangs 68a and 72a depending from the tube 82. It should be noted that in this forming operation the slot portions 66 and 67 take on the form of arch-shaped scallops which minimizes the stresses of the tube 82 during formation thus insuring against the tearing of metal.

Next the terminal portions of the longer particylindrical tangs 68a below the shorter particylindrical tangs 72a are formed into a partispherical shape with dies producing tongues 88 having particircular confronting edges 90 which are spaced apart less than the internal diameter of the sleeve portion 84. If the initial blank 60 was a cylinder, the retainer is completed when the requisite number of ball pockets are formed as described above. If the initial blank 60 was a flat strip, it is wound into an annulus with the butting ends secured to each other in some fashion after the requisite number of ball pockets are formed.

While the above description might give the impression that the requisite number of ball pockets are progressively formed in a blank, it is to be understood that the method is equally applicable to simultaneously performing a number of identical steps on various portions of the blank at the same time, i.e., cutting all of the holes needed for a particular retainer at the same time, drawing all the upstanding tubes at the same time, etc.

Further, while the retainer 12 has been described in conjunction with a ball bearing having a split inner race as the race separable from a unit-handled subassembly, it is to be understood that the retainer of my invention may be used in conjunction with ball bearings having other types of races separable from a unit-handled subassembly supplying the other race irrespective of whether the separable race is an inner race or an outer race. Consequently my invention also embraces a unitary sheet metal retainer which is controlled by the axially spaced lands of an inner full groove ball race and retains the balls in assembly with the inner race.

In essence, I wish it to be understood that I do not desire to be limited to the exact details of the construction and method shown and described, for other obvious modifications within the scope of my invention will occur to a person skilled in the art.

What is claimed is:

1. A unitary sheet metal retainer for use with a ball bearing having a plurality of balls having centers which lie in a pitch circle determined by the balls being disposed in the ball grooves of relatively rotatable inner and outer races comprising:

a flat ring sufficiently radially spaced from said pitch circle for guiding engagement with axially spaced lands on one of said races located on the same side of said pitch circle as said flat ring, said flat ring having a plurality of circumferentially spaced holes therethrough, a plurality of cylindrical sleeves aligned with said plurality of circumferentially spaced holes in said flat ring and depending radially from the marginal portions of said flat ring adjacent said holes for receiving said balls with a running clearance, each of said cylindrical sleeves having a pair of diametrically opposed radially depending tongues having roots at a location between said flat ring and said pitch circle and terminal edges located on the opposite side of said pitch circle from said roots and circumferentially spaced apart less than the diameter of said balls to prevent said balls from dropping out of said sleeves past the terminal edges of said pairs of tongues in the absence of the other of said races, and said pairs of tongues being sufficiently laterally resilient to allow the forced passage of said balls between the terminal portions of said pairs of tongues and into said sleeves without any appreciable permanent deformation to said tongues whereby said retainer is capable of forming a unit-handled subassembly with said balls and said one race.

2. The unitary sheet metal retainer as defined in claim 1 wherein said terminal edges of said pairs of tongues are particircular edges for engaging said balls in an approximate line contact to facilitate the forced passage of said balls past said edges and into said sleeves.

3. The unitary sheet metal retainer as defined in claim 1 wherein said sleeves have particylindrical portions disposed between said pairs of tongues which extend across said pitch circle.

4. The unitary sheet metal retainer as defined in claim 3 wherein said pairs of tongues have particylindrical portions in alignment with said sleeves extending from said roots to contiguous partispherical terminal portions on the opposite side of said pitch circle and spaced therefrom.

5. The unitary sheet metal retainer as defined in claim 4 wherein said pairs of tongues are aligned in the mid portion of the retainer and taper from their roots to their terminal edges.

6. The unitary sheet metal retainer as defined in claim 5 wherein said particylindrical portions of each sleeve consist of a single tapered pair and wherein each partispherical portion and each tongue has a root equal to approximately one-fourth of the circumference of said sleeves.

7. In the method of making a unitary sheet metal retainer for a ball bearing the steps of:

cutting a generally rectangularly shaped hole having oblique corner slot portions through a sheet metal blank so as to form pairs of mutually perpendicularly arranged tangs lying generally in the plane of the blank and extending toward the center of the hole, drawing the annular portion of said sheet metal blank surrounding said hole into an upstanding cylindrical sleeve with said tangs depending therefrom and generally conforming to the projected shape of the cylindrical sleeve, and forming the terminal portions of one pair of said pairs of mutually perpendicular tangs so that their confronting terminal edges are spaced apart less than the internal diameter of said cylindrical sleeve.

8. In the method of making a unitary sheet metal retainer for a ball bearing the steps of:

cutting a cruciform hole having a rectangularly shaped central portion and two angularly related sets of diametrically opposed slot portions opening into the central portion through a sheet metal blank so as to form a shorter pair of tangs perpendicularly arranged with a longer pair of tangs, said shorter pair of tangs and said longer pair of tangs lying generally in the plane of the blank and extending toward the center of the hole, drawing the annular portion of said sheet metal blank surrounding said hole into an upstanding cylindrical sleeve with said tangs generally conforming to the projected shape of the cylindrical sleeve, and forming the terminal portions of said longer pair of tangs below said shorter pair of tangs radially inwardly to a generally partispherical shape, said longer pair of tangs when so formed providing a pair of retaining tongues having confronting particular terminal edges which are spaced apart less than the diameter of a ball which has a running fit within said cylindrical sleeve.

9. The unitary sheet metal retainer for a ball bearing having a race having a full ball groove between a pair of axially spaced lands and a plurality of balls having centers which lie in a pitch circle when operatively engaged in the full ball groove comprising:

a flat ring sufficiently radially spaced from said pitch circle for guiding engagement with the pair of axially spaced lands, said flat ring having a plurality of circumferentially spaced holes therethrough, a plurality of cylindrical sleeves aligned with the plurality of circumferentially spaced holes in said flat ring and depending from the marginal portions of said flat ring adjacent said holes for receiving the balls with a running clearance, each of said cylindrical sleeves having a pair of diametrically opposed radially depending tongues having roots at a location between said flat ring and said pitch circle and terminal edges located on the opposite side of said pitch circle from said roots and circumferentially spaced apart less than the diameter of said balls to prevent said balls from dropping out of said sleeves past the terminal edges of said pairs of tongues in the absence of the other of said races, said pairs of tongues being sufficiently laterally resilient to allow the forced passage of said balls between the terminal portions of said pairs of tongues and into said sleeves without any appreciable permanent deformation to said tongues whereby said retainer is capable of forming a unit-handled subassembly with said balls and said race, said pairs of tongues including partcylindrical portions between said roots and said terminal portions, and each of said cylindrical sleeves having radially depending partcylindrical portions disposed between said pairs of tongues and which extend across the pitch circle.

\* \* \* \* \*